C. GAINES.
Plows.

No. 146,524.  Patented Jan. 20, 1874.

Attest:
T. W. Howard
Wm. E. Chaffee

Inventor:
Coleman Gaines
by his atty
Cox & Cox

UNITED STATES PATENT OFFICE.

COLEMAN GAINES, OF LINCOLN, ILLINOIS.

IMPROVEMENT IN PLOWS.

Specification forming part of Letters Patent No. 146,524, dated January 20, 1874; application filed July 11, 1873.

*To all whom it may concern:*

Be it known that I, COLEMAN GAINES, of Lincoln, Illinois, have invented certain new and useful Improvements in Plowshares, of which the following is a specification, reference being had to the accompanying drawing.

The invention relates to a plowshare having an acute or diamond point, which is substantially level, for the double purpose of bringing the draft of the device at its center, and running below and parallel to the surface of the ground, and having a mold-board at its rear.

Figure 1:
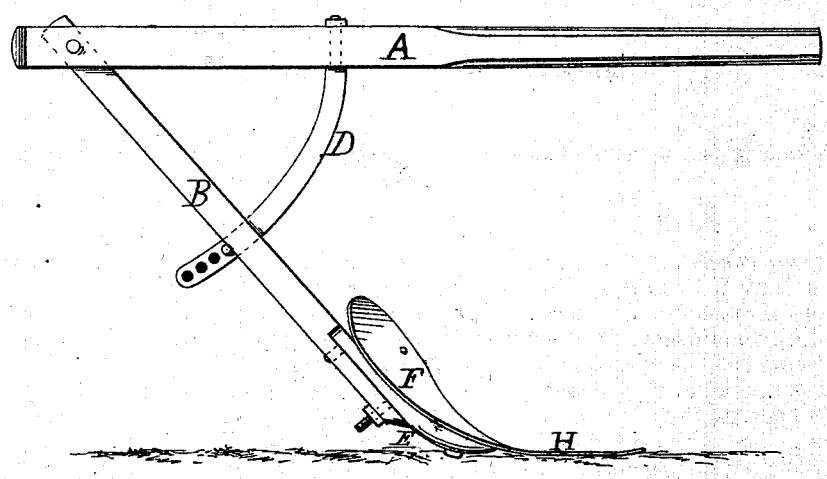
Figure 2:
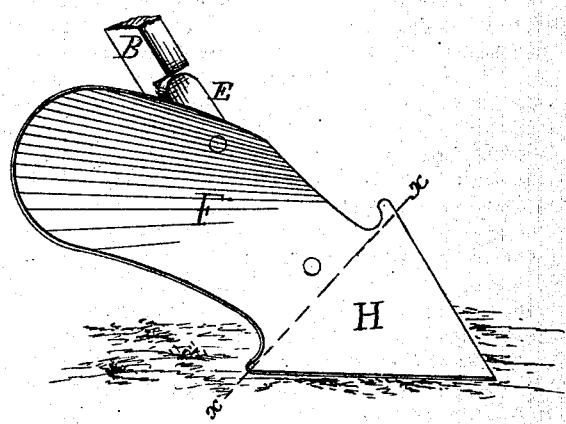

Figure 1 is a side elevation of a device embodying the elements of the invention, showing its operative position and method of propulsion. Fig. 2 is a perspective view of the share.

A in the accompanying drawings is a drag-bar, to the rear end of which is pivoted the standard B, a gage, D, connecting these parts, as shown. To the lower end of the standard B is secured the plowshare-seat E. The above parts being well-known devices, no claim is laid thereto. The plowshare consists of the mold-board F and the point H. The mold-board F is of proper dimensions, as shown, and tapers on each side to the line $x\ x$, about which are provided the curved recesses $i$, the line $x\ x$ indicating the base of the point H. The surfaces of the point H are substantially flat, as shown, its extreme front having, however, a slight upward inclination or curve to prevent the point from plunging into the ground. Care must, however, be taken not to make the point D so curved or otherwise constructed as to prevent its running below and parallel to the surface of the ground, as any such change would defeat the object of the invention. The bases of point H and mold-board D are united at the line $x\ x$. The share is securely mounted upon the seat E, as shown in Fig. 1. The general surface of the point D should be parallel to the drag-bar A.

By the arrangement and construction above specified the side edges of the point D alone cut the soil, and from the fact that these edges are equal, the draft is preserved in the center of the point D.

The plowshare is preferably wrought or molded of one piece of material.

What I claim as my invention, and desire to secure by Letters Patent, is—

The mold-board, shares, and point of a plow, formed of one piece of metal, the mold-board curved, as described, in the line of draft, and straight transversely, the point running parallel with the surface of the ground and the shares projecting laterally, all substantially as shown, and for the purpose set forth.

In testimony that I claim the foregoing improvements in plowshares, as above described, I have hereunto set my hand and seal this 8th day of July, 1873.

COLEMAN GAINES. [L. S.]

Witnesses:
 WILLIAM ROSS,
 GEORGE H. HAWLEY.